May 5, 1970 P. EISLER 3,510,547
METHOD OF HEAT TREATING A BODY OF CURABLE MATERIAL
Filed May 12, 1966 7 Sheets-Sheet 3

Inventor
Paul Eisler
By
Watson, Cole, Grindle & Watson
Attys.

May 5, 1970  P. EISLER  3,510,547
METHOD OF HEAT TREATING A BODY OF CURABLE MATERIAL
Filed May 12, 1966  7 Sheets-Sheet 6

Inventor
Paul Eisler
By
Watson, Cole, Grindle & Watson
Attys

May 5, 1970   P. EISLER   3,510,547
METHOD OF HEAT TREATING A BODY OF CURABLE MATERIAL
Filed May 12, 1966                                    7 Sheets-Sheet 7

Inventor
Paul Eisler
By
Watson, Cole, Grindle & Watson
Attys.

united States Patent Office
3,510,547
Patented May 5, 1970

3,510,547
METHOD OF HEAT TREATING A BODY OF CURABLE MATERIAL
Paul Eisler, 57 Exeter Road, London NW. 2, England
Continuation-in-part of application Ser. No. 165,736, Jan 12, 1962. This application May 12, 1966, Ser. No. 549,681
Claims priority, application Great Britain, Jan. 20, 1961, 2,384/61; Jan. 20, 1966, 2,626/66
Int. Cl. E04b *1/16;* B28b *21/78*
U.S. Cl. 264—33                                    3 Claims

ABSTRACT OF THE DISCLOSURE

A method is provided for producing a shaped body of curable material, the solidification of which can be accelerated by heat. An electric heating film is positioned in a mold structure which defines the shape of the body produced. A thin crust of curable material is applied to the film in order to form a shell of the desired shape when cured and the film is energized for a short time in order to cure the crust. The shell and mold structure are separated while leaving the film on the shell. The shell is then filled with more curable material and the film is further energized to cure the body.

---

This application is a continuation-in-part of my application Ser. No. 165,736, filed Jan. 12, 1962 for Electrical Heating Film, since matured into Pat. No. 3,283,284.

The present invention relates to electric heating by means of a heating film, that is to say, a thin, usually flexible structure incorporating at least one electrically conductive layer which is so thin that its thickness is minute compared with its surface dimensions, the layer incorporating or being provided with terminal areas accessible at the boundaries of the film, the terminal areas and the nature and or patterning of the conductive layer being such that when the terminal areas are connected to a supply of electric current, the current flow and distribution produce a substantially uniform heat distribution over at least predetermined zones of the area of the film.

For the purposes of the present invention the film is preferably designed as that the desired rate of the heat dissipation is obtained when a low voltage supply is used By low voltage is meant a voltage which is not dangerous if human contact is made with the conductive layer, which in practice generally means a voltage below 50 volts. A low voltage has advantages for the present purposes, which will be pointed out later, which are quite additional to the safety aspect.

The conductive layer of the heating film could consist of a high resistance material such as carbon or graphite uniformly distributed on a thin support layer of insulating material such as paper, or between two such layers with terminal zones of metallic foil so that over any terminal zone the potential is sensibly the same. Alternatively a carbon film (provided with terminal zones of metallic foil) might be used, that is a film made from carbon by processes similar to paper making or by processes of weaving or felt making similar to those used with asbestos, as described in my application Ser. No. 368,544, filed May 19, 1964, now Pat. No. 3,390,014, for Electric Batteries. A simple example of such a film using carbon as the conductor would be a rectangular film with a terminal zone over the whole length of two opposite margins. Then even though connection to the supply were made at small areas of the two terminal zones, each of the two terminal zones would be at the same respective potential and the current flow would be substantially uniform across the conductive layer from one terminal zone to the other, and the heat development would be uniform over the whole area. Usually, however, the conductive layer of the heating film will contain a pattern of parallel metallic foil strips or arms. Thus terminal zones of foil extending longitudinally (for example along the two opposite margins) may have integral strips or arms extending laterally, the strips or arms on one terminal lying between those on the other, leaving gaps between them which are bridged by carbon or graphite, so producing a uniformly distributed conductive pattern of appropriate resistance; the whole being supported on a sheet of insulating material or more usually between two such sheets. An example of such a pattern is to be found described with reference to FIG. 11 in my Pat. No. 3,033,970.

It is preferred, however, to make the whole conductive layer of terminal zones and a pattern of parallel strips or arms which form conductive paths between the terminal zones, in particular a meander pattern consisting of substantially parallel conductive arms with narrow elongated insulating spaces between the arms and bridges joining the ends of the arms, which is so thin that the thickness is minute compared with the surface dimensions while the pattern is distributed over and occupies the area from which the heat is to be dissipated, insulation being provided on one or both faces and/or in the spaces between the arms. Such a conductive layer is desirably made from metallic foil, especially aluminium foil, and a preferred construction of such a film is described in the parent application Ser. No. 165,736, now Pat. No. 3,283,284 aforesaid while methods and apparatus for making it are disclosed in my application Ser. No. 510,278, filed Nov. 29, 1965, now Pat. No. 3,408,735 for manufacture of Patterned Webs.

An electrical heating film as defined above can be made thin, flexible, and inexpensive and of extremely wide application in that it can be placed almost anywhere within or on the boundary of any space or substance as an instantaneous and homogenous source of heat of any desired temperature below that at which the material or materials used in the essential structure of the heating film itself would melt or be destroyed. The space required for the heating film is so negligible in view of its thinness and the cost of the heating film per unit area in most constructions is so low, namely of the order of that of normal dispensable packaging material, that there is no substantial spatial or economic reason in almost any field of use of the film for restricting the heat emitting area constituted by the area of the film. This use of a large area of heating film again permits the desired quantity of heat energy to be emitted at the lowest useful temperature.

The present invention is concerned with the heat treatment of a body of a curable structural material the solidification of which can be accelerated by heat. Solidification may be defined for the present purposes as an increase in viscosity of a substance which starts in fluent or readily deformable condition and finishes in a condition which is solid at least for practical purposes. According to the nature of the substance the cure may then proceed by a gradual increase in viscosity, but with many substances the increase is not uniform but tends to accelerate during the last stages. Two important classes of structural material with which the invention is concerned are concrete which is used in building, civil engineering and similar operations, and so-called plastics materials, especially reinforced plastics materials, such as fibre-glas-reinforced synthetic resins which as well as being used in building, civil engineering and similar operations whether as part of the final structure or as formwork in such operations, are used for a wide range of other purposes such as production of hulls and other parts of boats, road rail and air vehicle bodywork and equipment, tanks and containers, chemical plant, electrical, industrial, domestic, sports and display equipment. The term viscosity is used herein in a broad sense, in that the materials with which the invention is concerned are not Newtonian liquids. This is especially so as regards concrete which when mixed is readily deformable without being fluent though it becomes fluent when disturbed as by vibration, but even so is far from a liquid.

While substances of the kind in question are being cured they are usually occupying a mold structure which term includes formwork or shuttering), and even if not as in the case say of concrete laid in trenches or excavations which in effect constitute a mold structure which confines it to the foundations of buildings, roads, or the like, no further progress with the work can be made until the molds have been separated from the material, or the material in the trenches or excavations has hardened sufficiently to withstand the loads imposed by further steps in the building or civil engineering operations. The invention shortens the time of curing by accelerating at least a part of the curing operation by heat and it does this by the steps of positioning an electric heating film (as above defined) having an area substantially not less than the area of the minimum cross-section of the body of material in spatial and heat conductive relationship to the body of the material whereby when the film is supplied with electrical energy at a predetermined rate, the viscosity of the material will be increased in a desired time and spatial progression by heat dissipated from the film, and supplying electrical energy to the film for a determined time at a determined rate.

In view of the nature of the heating film, especially the distribution of the heating effect over substanially its whole area, a given rate of heat dissipation is achieved with a minimum temperature gradient betwen itself and the material and especially without the production of hot spots which could lead to damage to the film or local over-rapid hardening of material. When the film can be set in extended form across the whole cross-section of the material either within it or on its surface or in both locations, the heating can be made substantially uniform in cross-sections parallel to the film or films while it will progress in a uniform manner normal to the film or films which helps in predetermining the general progress of the heating operation in time and space. In other cases, though the area of the film will not be less than the minimum cross-section of the body of material, it may be desirable or necessary to dispose the film in a form which is not extended across the cross-section of the material, but is distributed within it in a skeletal form, examples of which will be given. As will be explained later provision can be made in the form of a viewing box enabling preliminary investigations to be made in any particular case. The invention enables a very high rate of acceleration of cure to be achieved with the minimum risk of local damage or defects. Considering first the case of concrete, it must be kept in mind that the setting of concrete is a chemical reaction which can be accelerated by heat very drastically. This acceleration has basically nothing to do with evaporation of water from the cement slurry into the air. It is a hydration process of some complexity and the reaction is exothermic, i.e. it produces itself heat which raises the temperature of the mass and must eventually be dispersed from its surface.

Various aspects of this reaction will be considered in the present application; accelerating the reaction being the first and overriding one. Any method of heating would achieve a speedup of the reaction, but the use of elecrtical heating film has the advantage of adaptability and its flexibility to desired time cycles.

The use of a heating film has the great advantage that the rate of heat dissipation e.g. in watts per square foot can be varied by varying the voltage of the supply or by varying the scheme of connections, for example series or parallel connection in various groupings and in this way a desired variation in relation to time be effected. A convenient approximation can be obtained by relating the temperature of the film to time. The very low heat inertia of the film contributes to accurate control. Variations can be effected automatically for example under the control of a "Simmerstat" responsive to heat dissipation or a thermostat or a time-switch arrangement. In some cases pulsating energisation may be used. These schemes apply not only to concrete but also to other materials within the scope of the invention.

The invention will further described with reference to the accompanying diagrammatic drawings in which the thickness of the heating film usually has to be exaggerated for the sake of clarity.

FIG. 3 illustrates the application of the invention to a foundation for a building, road or the like.

FIG. 27 is a longitudinal section and

FIG. 28 a cross-section illustrating the application of the invention to the continuous production of a tunnel or similar tubular structure.

Figure 1:
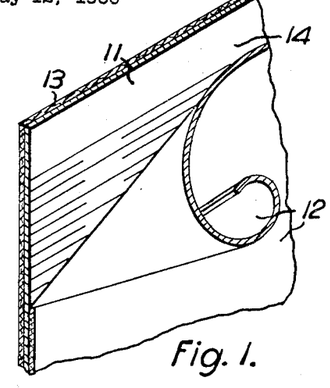
FIG. 1 illustrates the structure of one type of heating film which can be used in practising the invention.
Figure 2:
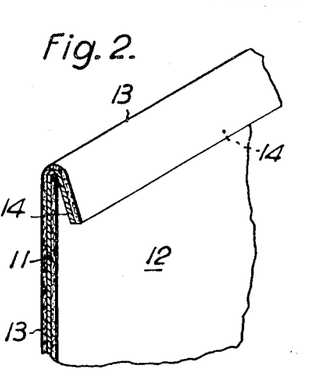
FIG. 2 shows the film of FIG. 1 with a busbar folded over.

The heating film shown by way of example in FIG. 1 is a three-ply laminate comprising a meander-patterned metallic foil 11 (say aluminium) between two papers 12, 13. Opposite wide margins of the foil, one visible at 14, are unpatterned and bare on at least one surface to constitute busbars and are folded over as indicated in FIG. 2 in which the bars metallic surface is on the inside, the paper layer 13 overlying the busbar. The meander pattern presents a multitude of similar electrical paths in parallel between the two busbars and when connection is made to a supply through the busbars a substantially uniform current distribution and therefore heating effect is obtained over the whole patterned area.

Figure 3:
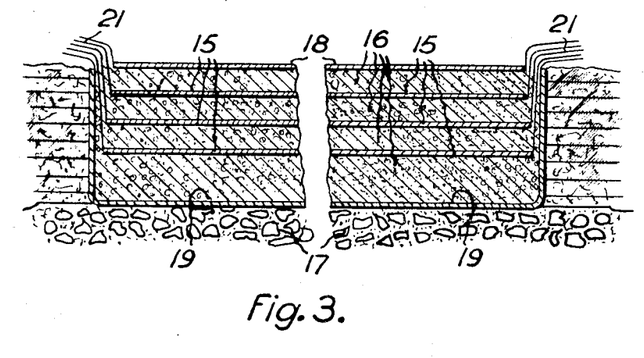

As shown in FIG. 3 films such as that shown in FIG. 1 can be placed as at 15 within the cross-section of a concrete layer 16 such as the layer within a trench on a foundation 17 in planes parallel to the surface and extending substantially over the whole cross-section and/or on the surface as at 18. The films can be placed at any convenient time prior to, during or after the pouring and vibrating of the mixed concrete. A film may also be placed as at 19 directly on the foundation 17. Connections can be taken out for supplying the films at the sides as indicated at 21.

A similar arrangement using an open-topped mould structure can be made for lift-up systems of slab production.

The foundation 17 may be for a building or it may be for a road, runway or the like. Films may similarly be placed in natural or manufactured mould structures during the building or prefabrication of drainage and other channels and pipes and other structural or wall or pillar forming materials whether reinforced or not. Other examples are reinforced or prestresed structural frames and flooring units, beams and smaller structural units ranging from fence posts, lintels, railway sleepers, lighting columns, facing slabs, cast stones or larger products such as manholes and gullies. Further developments in which the film is embedded in the concrete will be given later.

Figure 4:
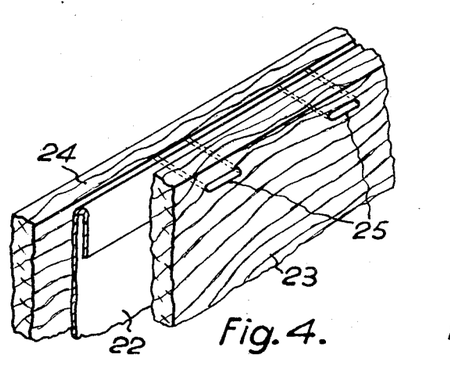
FIG. 4 illustrates the use of the heating film within the wall of a mold or shuttering.
Figure 5:
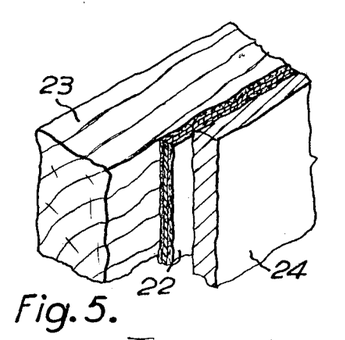
FIG. 5 illustrates an alternative to FIG. 4.

With the structures for which a mould (formwork or shutering) is required, the films can be used within the shuttering or as a kind of building paper. Thus it can be a layer laminated within the shuttering boards or be used in the outer or inner surface of the shuttering boards or be laid in any desired position within the cross-section of the concrete structure. When a shuttering of timber, plywood or plastic faced boards is to be used, as shown in FIG. 4 the heating film 22 can be placed between two thicknesses of board 23, 24 and laminated together with these boards by bonding both surfaces or sticking one or both surfaces of the film to them. It is, however, preferable to enclose the heating film between the two boards and simply nail, screw or staple, or otherwise fix the two boards together along their long edges. The nails, screws or staples 25 can pierce the heating film without causing shorts, as the film is disposed with the bushbars and meander arms running parallel with the long edges of the board, and pins, nails, screws or staple limbs piercing the foil are therefore all at the same potential. As shown in FIG. 5 the two (wooden) boards 23, 24 need not be of equal thickness. It is preferable that the board 24 contacting the concrete may be thin and well impregnated, or faced with a non-water-absorbent layer (paper-resin laminate), epoxy resin coated and impregnated glass cloth, etc. so as to stand a relatively large number of uses while the thicker board 23 is the backing and not in contact with the concrete.

The electric current is conducted to the heating film from the low-voltage secondary winding of a mains transformer via tape cables with foil conductors, preferably aluminium foil conductors, and enters the film by terminals anchored in the thicker board at a convenient place along the long edge of the board, usually at one or both of its ends.

Figures 6, 7, 8, 9, 10, 11:
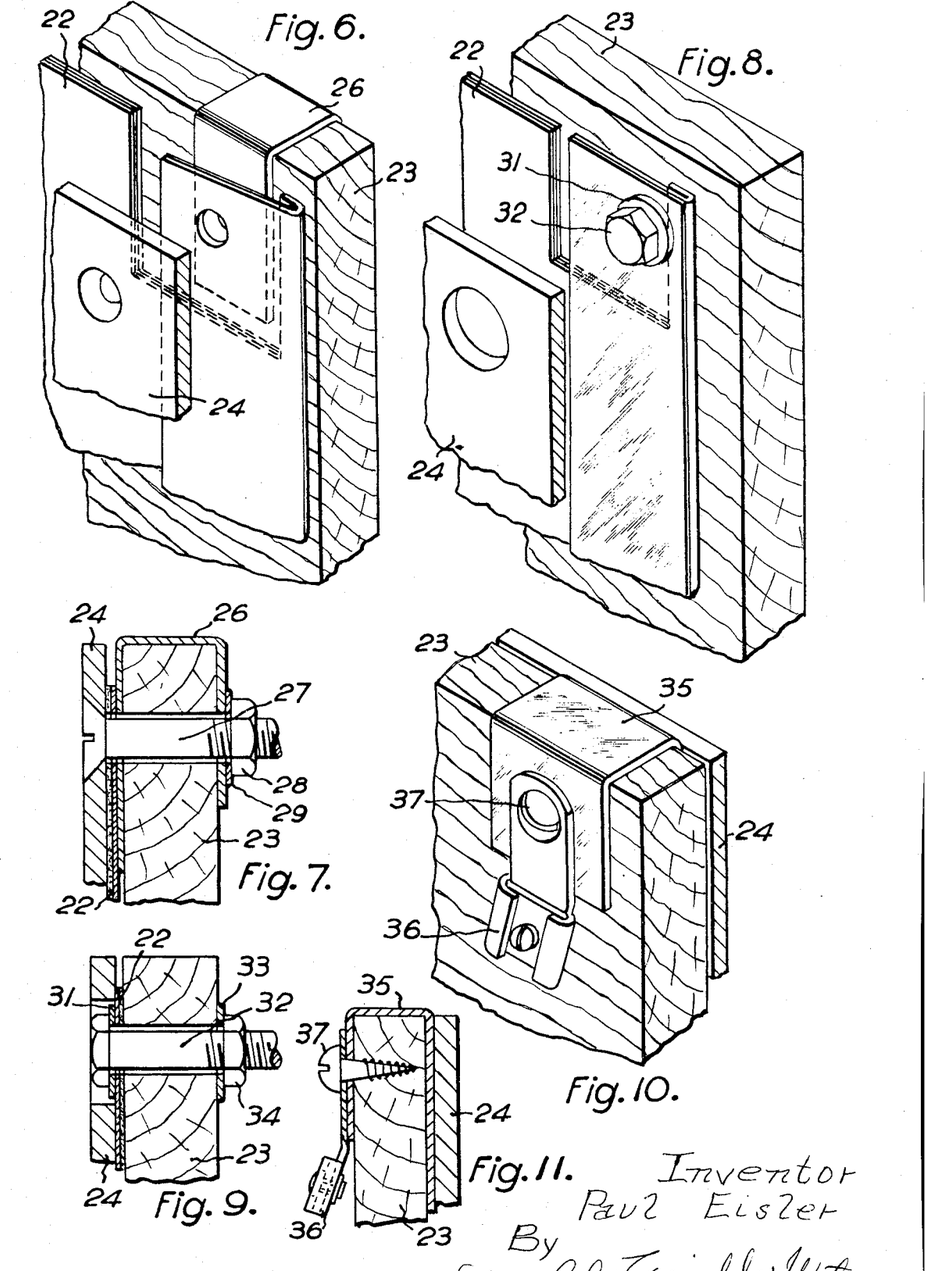
FIG. 6 illustrates one way of taking the supply to the film in a mold as in FIGS. 4 or 5.
FIG. 7 is a section of FIG. 6.
FIGS. 8 and 9 are similar views to FIGS. 6 and 7 of an alternative way of making connection to the film.
FIGS. 10 and 11 are similar views to FIGS. 6 and 7 of yet another alternative way of making connection to the film.

There are several constructions of terminals, but one of the simplest shown in FIGS. 6 and 7 is achieved by slipping U-shaped metal clips 26 over the shorter edge of the backing board 23 in contact with the bare foil busbar 14 within the folds of the film margin. By bolting the clip to the board by a bolt 27 and nut 28 pressure is exerted on the clip 26 and foil-busbar 14 as well as on the clip 26 and a current-feeding foil-lead 29 over a large area, as is desired for the low-voltage, high-current conditions of running of the heating film.

Another form of terminal is shown in FIGS. 8 and 9. Here the film is folded to bring the bare busbar 14 on the outside of the film and a washer 31 under the head of the bolt 32 makes good surface contact over a large area with the busbar and the bolt 32 itself serves to carry the current from the foil lead 33 engaged by the nut 34.

Yet another form of terminal is shown in FIGS. 10 and 11. Here the film is assumed cut from a supply of material, with busbars extending beyond one end of the general area of the film. These busbars are folded to bring the bare metal on the outside as in FIGS. 8 and 9, and the extra length then folded over the board 23 as at 35 and a screw terminal 36 shaped to receive and and hold a tape supply cable is held in good contact with the busbar 35 by a wood screw 37.

If the shuttering is of steel, or if other metallic moulds are used the heating film can be stuck to or held under pressure against the outside surface of this formwork, the paper surface of the heating film serving as electrical insulation against the metal sheets or moulds. Care must be taken to insulate the terminal clips or bolts from the steel or other metallic formwork.

The life of the various constructions of shuttering in use at present, i.e. how often the shuttering can be used, depends to a great extent on the degree of absorption of the facing of the shutering, its abrasion resistance, robustness, and the care with which it is handled, cleaned and coated. When the heating film is positioned within or on the outside of the mould or shuttering the lift of this formwork is not much affected.

Figures 12, 13:
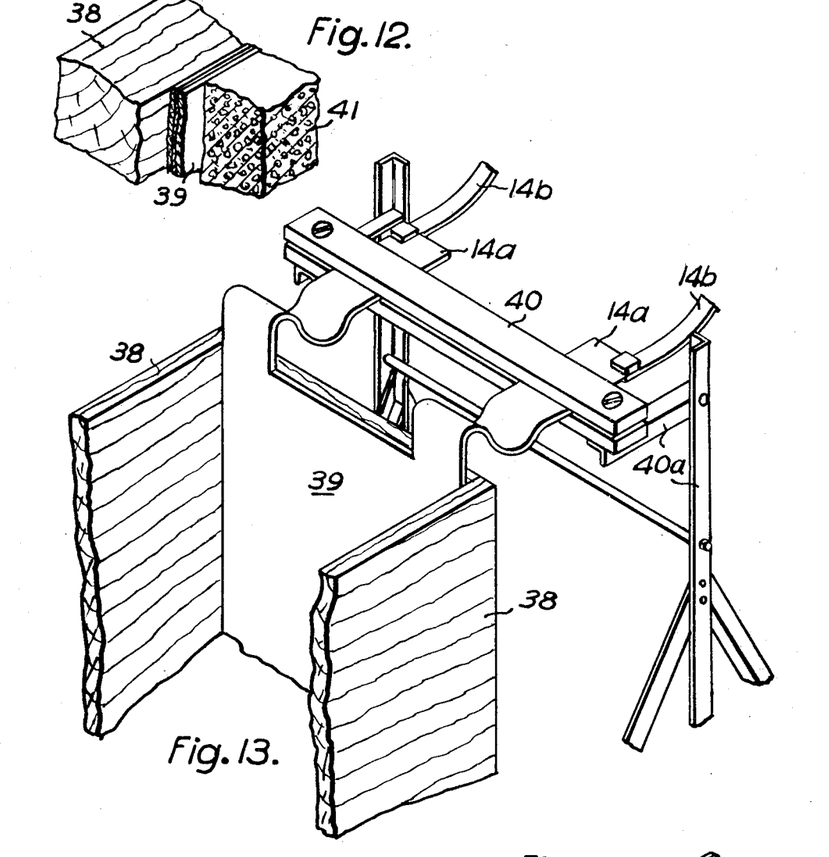
FIG. 12 illustrates the use of the film on the inside wall of the mold.
FIG. 13 illustrates one way of taking the supply to the film from the inside of the mold.

An entirely different aspect prevails, however, if as in FIG. 12 the heating film itself is used as the inside facing of the formwork 38, the film 39 being directly in contact with the concrete 41. This is a preferred use of the heating film, and this use is rendered economic by the low cost of the heating film which makes it a dispensible article which can be thrown away after only one or a few uses. The labour of laminating the film between shuttering boards is saved and the film is simply placed or lightly fixed on the inside surface of the mould or shuttering.

If at least one surface of the heating film is covered with a low melting point pressure-sensitive or dry adhesive, such as a low melting point hot-melt adhesive or a wax, the fixing of the heating film to the shuttering board can be very conveniently effected and the adhesive or wax will be liquid and act somewhat as a lubricant while the hot heating film is being separated from the board. For attachment to steel moulds the heating film may be covered with a layer or layers containing permanent magnetic particles such as ferrites, after the fashion of pigments in a varnish coating. These layers act similarly to dry adhesive layers in causing the heating film to adhere to the steel mould but allow it to be readily shifted by sliding along the steel surface. The adhesive force of these permanent magnetic layers will be all the greater if the heating film embodies a steel foil pattern instead of the usual aluminium foil pattern. The permanent magnetic layers as well as the heat sensitive adhesive layers are of use not only for affixing the heating film to complete moulds but also for laminating it to steel sheets or between boards which form parts of the mould structure. With these provisions the adhesive layer at least at an elevated temperature offers a smaller resistance to forces parallel to said layer than to forces perpendicular to said layer at the temperature which the part of the mould structure has when the heating film is affixed to it.

The heating film produced for this mode of use is of the substance of a strong building paper and consists, as before, essentially (apart from the adhesive layer if used) of three layers, the centre layer being a patterned metallic foil. One at least of the outer layers is preferably a packing paper or an even more robust paper, and the other layer is or comprises either a coated paper, a plastic film (for instance a polythene or polypropylene film) a coated foil, or a combination of these materials, making the heating film a reliably abrasion-and-moisture-proof, highly polished interlayer for at least one use. The plastic film or a coated metal foil makes it impermeable and offers an extremely smooth skin to the concrete.

The heating film therefore not only preserves the life of the shuttering, and saves labour and cleaning, but also gives a better result because of its lack of absorption, better heat transfer to the concrete and lower heat loss, the total thickness of the shuttering being kept dry and acting as thermal insulator. The concrete sets with a smooth surface and the layers near the film are soon firm enough not to require the mechanical support of the formwork any longer. They can withstand unsupported the pressure from the much less cured concrete inside the structure.

If the shuttering has the heating film laminated within its layers or stuck to its outside the removal of the shuttering also removes the source of heat and of the acceleration of the curing. If, however, the heating film is placed on the inside of the framework, the shuttering or mould can be removed while the film remains on the concrete, heating it further and also preventing it from drying out. Thus the acceleration of the curing continues while the shuttering or mould can already be used elsewhere and the structure can remain under an impermeable cover for as long as desired. Thereafter the plastic film or coated foil surface of the heating film permits its being readily stripped off the concrete. As shown in FIG. 13, the foil conductor of the tape cables 14b feeding the heating film 39 are in this example directly connected to the busbars 14a of the heating film 39 and not through bolts fixed in the shuttering, but provision is made to secure the tape cable mechanically near the terminals independently of the shuttering, for example by a clamp 40 supported by a framework 40a of angle iron or the like.

The previous figures have all assumed that the heating film is supplied in a width to be used in single pieces. However for economic reasons it is desirable to produce the film in a few standard widths or perhaps only one width in lengths only limited by the lengths in which the materials of which it is made are available, whereas the mould structure may be of any size and of a size which may not be of any particular standard. Such standard widths of films desirably have the busbars such as 14 above described disposed so that several widths of film can be interconnected edge to edge.

Figures 14, 15, 16, 17, 18:
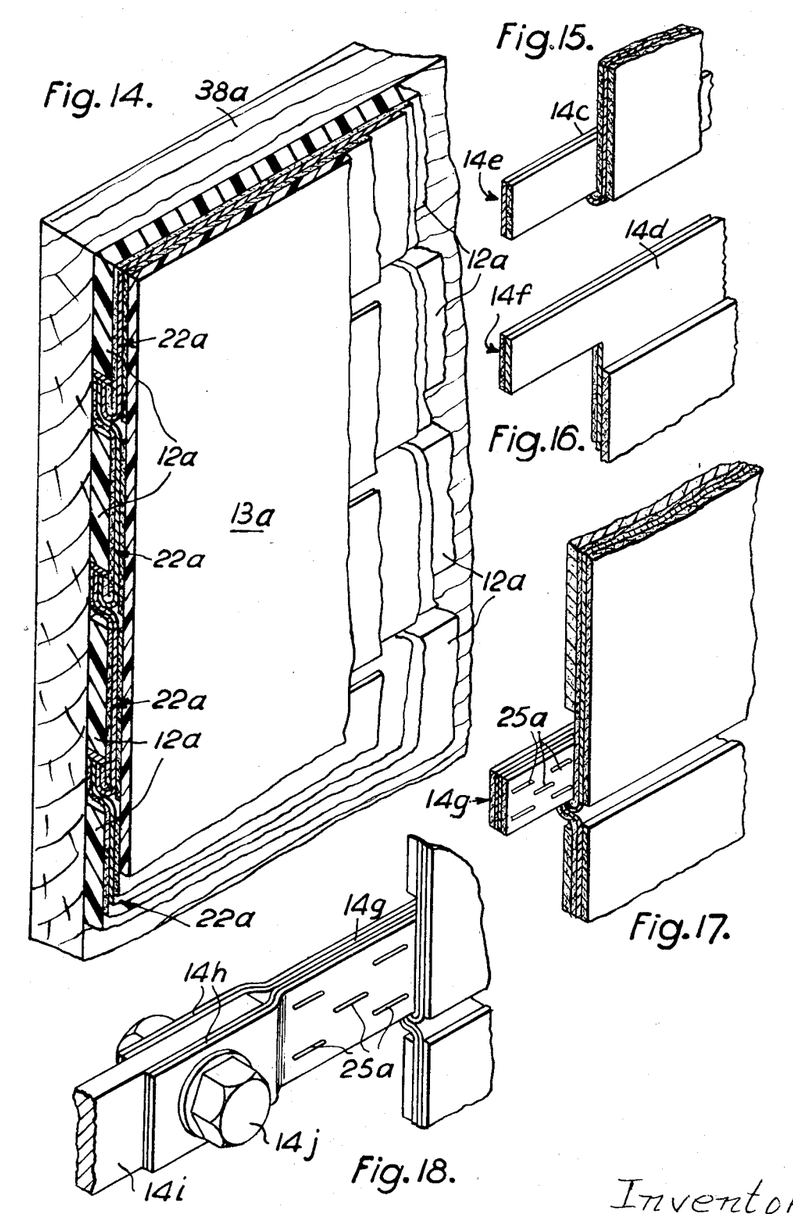
FIG. 14 illustrates a film made up of narrower standard widths.
FIGS. 15 to 18 are details of FIG. 14.

Thus as shown in FIG. 14 which corresponds in some ways to FIG. 5, widths 22a of film having a busbar margin along one edge folded over and bared at 14c on the outside, FIG. 15, and a busbar margin 14d, FIG. 16, along the other edge bared on the opposite side. If a number of widths are disposed so that the bared busbar 14c of one overlaps and is pressed into contact with the bared busbar 14d of the next width, at least at intervals, the overlapped busbars are electrically interconnected. Where the films are mounted between boards as in FIGS. 4 and 5 this contact pressure could be achieved by the nails, screws or staples being driven at the appropriate positions, but it is preferred both when the films are between boards and when they are on one face or the other of the mould structure, to carry the busbars beyond the ends of the width of film as at 14e, 14f, FIGS. 15 and 16, and only secure these extended parts together as by staples 25a, FIGS. 17 and 18. If only interconnection is required the extended parts are cut off to leave short flaps 14g, FIG. 17, while these flaps are to serve as terminals for external connection they are left full length, extending beyond the stapled zone, as at 14h, FIG. 18, to receive flat cable conductors 14i, connection pressure being applied for example by bolts such as 14j.

These overlapped margins locally increase the thickness and this can be compensated by providing each width with an insulating strip 12a, FIG. 14, of appropriate width and thickness; these strips can be applied during manufacture. On the other face there may be a single cover sheet 13a say of paper or plastics material covering the assembled widths. FIGS. 14 to 18 assume that these assembled widths are used in the inside surface of the mould structure 38a but this mode of assembly can be used with film on the outside face or between boards or the like.

The continuation as above described of the accelerated curing by the heating film after demoulding adds to the advantages referred to above a very significant reduction in the number of moulds necessary for a given large output in a pre-casting plant of or formwork on site if a quicker cycle of use can be arranged.

It is advisable to secure the adhesion of the heating film to the concrete during the demoulding operation by taking care not to pull it off when moving the shuttering. In addition to such care temporary fixings, particularly on the edges of the film, can be provided to make sure that the film remains in position. After the removal of the mould or shuttering the film can continue the heat curing, and after it is switched off it can stay on the concrete as an impermable cover preventing the loss of moisture from the concrete. Keeping the curing concrete wet is a very important function which this method of use of the heating film with its impermeable plastic film or coated foil as barrier fulfils in addition to accelerating the setting of the concrete and to providing it with a smooth facing.

In the example just given the barrier layer is positioned directly adjacent to the concrete surface, the patterned metal foil and the backing of the heating film follow and are followed themselves by the wall of the mould or formwork.

If the heating film is used the other way round and its structure slightly altered we have a building paper which permits more moist heat curing. In this case the heating film comprises a metal foil pattern carried by a paper which is heavily calendered on the outer side. The other layer sandwiching the foil pattern is a moisture barrier, i.e. a plastic film or metal foil coated with a varnish or paper to insunlate it from the foil pattern. It is preferably only so lightly attached to the other layers that it can readily be lifted or stripped off when desired.

This heating film is laid on the inside wall the mould or formwork with the calendered paper facing the concrete while the barrier layer is next to the wall of the mould or shuttering. A minute amount of water from the concrete mixture will be absorbed by the paper, but any other loss is prevented by an impermeable barrier layer. The low A.C. voltage supplied to the foil pattern is not short-circuited by the absorbed water, and when curing has progressed sufficiently to permit demoulding the barrier layer of the heating film which adheres to the concrete can be lifted; the paper be wetted thoroughly from th outside and the heating continued with the barrier layer put back over the wet paper and foil pattern.

Alternatively the barrier layer can be stripped off and replaced by a wet burlap itself covered by a plastic film, openings being provided whereby water can be injected later on again to the burlap. During all this time the heating can be continued until the concrete is fully cured and the heating film with or without the barrier layer can stay on the concrete—if it is a precast product—as protective cladding during transport from factory to site.

In the example described the heating film has been laid on the inside surface of the mould or shuttering. It can also be used as a kind of blanket on top of the concrete. Its heating function, is, of course, less prominent in such use, particularly if it is covering a pond of water at the top; however, it prevents the evaporation of water or its being blown-out by wind and warms it at the same time ensuring the desired wet curing of the concrete. For this use of the heating film both layers enclosing the patterned foil are preferably of plastic.

Figure 19:
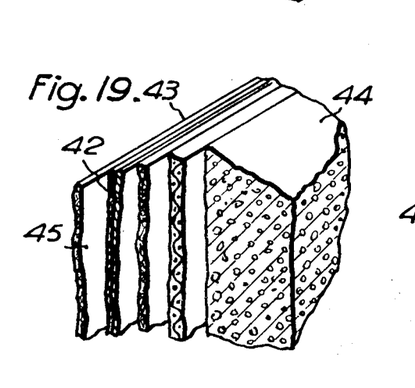
FIG. 19 illustrates one way of keeping concrete wet during curing.

The "keep-the-concrete wet" function of the film can be accentuated also if the film is used as building paper and laid, as in the previous examples, on the inside suface of the mould or shuttering. It will stick to the concrete when de-shuttering. Then as shown in FIG. 19 the whole film 42 with its moisture barrier layer 43 is then temporarily taken off the concrete 44, a sheet of moist burlap 45 is laid on the concrete, the whole film is put back on the burlap and switched on again. Any gaps in this covering (at corners or the like) are sealed up with any suitably impervious layer or material and the curing of the concrete continues within a warm humid cover. Additional provision can be made to inject water or steam to the burlap underneath the heating film.

Figure 20:
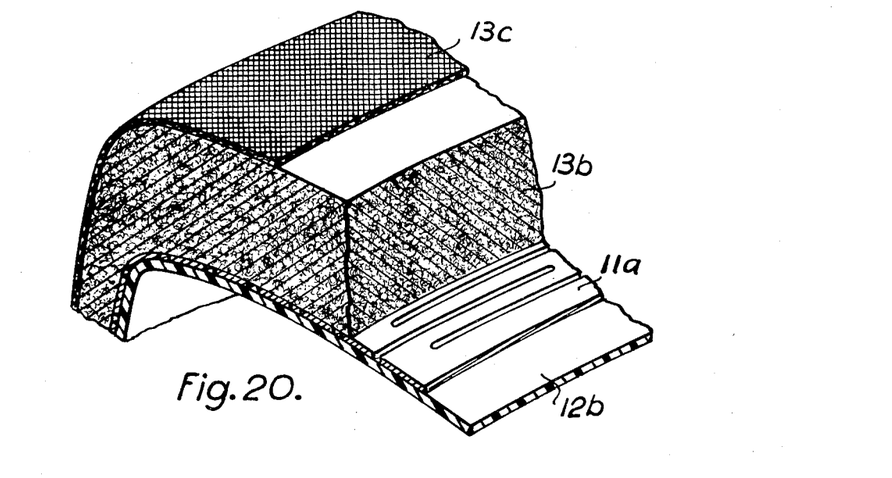
FIG. 20 is a part section illustrating a steam or moisture retaining hood used in the invention.
Figure 21:
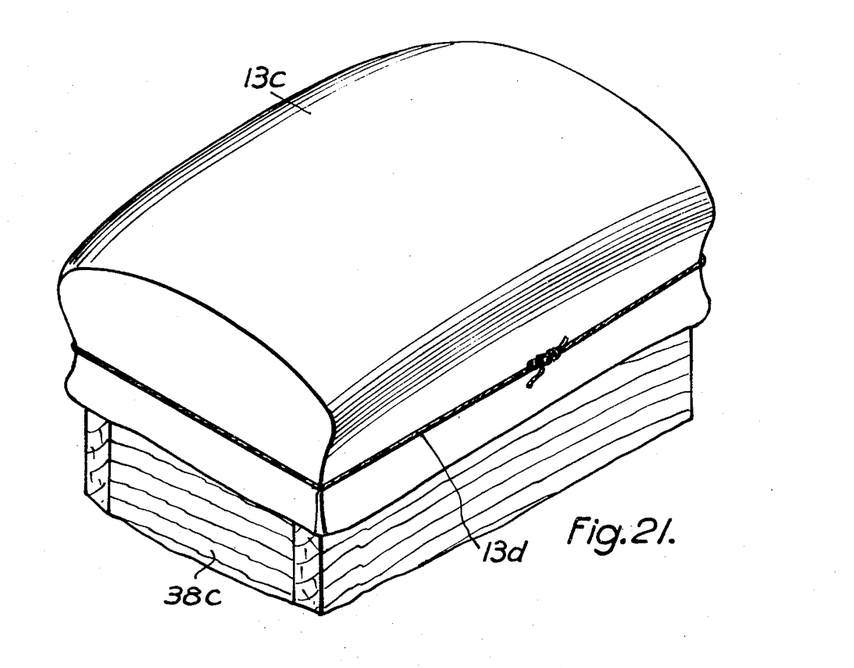
FIG. 21 shows the hood in FIG. 20 in use.
Figure 24:
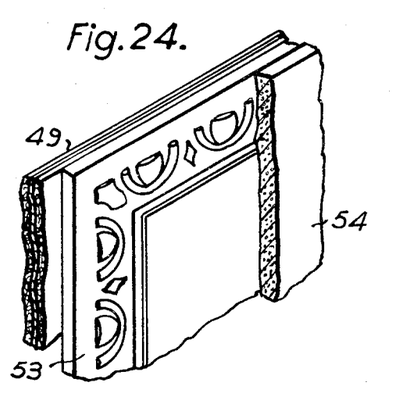
FIG. 24 illustrates the use of a film in conjunction with a layer which applies a relief pattern to the material being cured.
Figure 26:
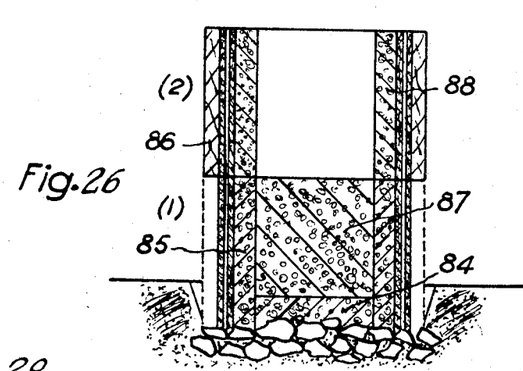
FIG. 26 illustrates the application of the invention to the production of a body of the cured material in stages.

A development of this scheme which also constitutes an example of a blanket on top of the concrete as mentioned above is shown in FIGS. 20 and 24. Here the film the conductive foil pattern of which is marked 11a is sandwiched between an impervious rubber or plastic material inner layer 12b and an outer layer 13b of highly heat insulating material exemplified by foamed plastics material covered by a separate or integral weatherproof layer 13c. The whole is formed into a hood which forms a steam trap or heatable hood covering and secured to the otherwise open mouth of a mould structure marked 38c. Conveniently the hood is secured by a strap or cord 13d.

The above description shows that the heating film can have various functions in addition to that of accelerated curing by dry or wet heat. Mention has been made of its use to prevent drying out of the concrete and to keep the concrete wet, to preserve wooden formwork and to save cleaning moulds of all types, to serve as a blanket or protective cover during transport and storage and to assist in obtaining a smooth surface of the concrete. The last point needs further elucidation, it is being assumed that the heating film is used by being positioned on the inside wall of the mould and usually sticks to the concrete when the concrete is taken out of the mould, or the mould or formwork removed from the concrete.

It will be readily understood that in such circumstances scratching or other injuries to the concrete surface by the separating operation are prevented or reduced, and the concrete surface will be a fairly true replica of the adjacent heating film surface which is a glossy abrasion resistant plastic film, a coated foil or a highly calendered paper. It will therefore be as smooth as if it were polished when the heating film is stripped off it, which can be after either the whole heat curing is complete and the film is not needed any longer on the concrete as a protective (see above) or immediately after de-moulding if the heating film is to be re-used at once in the same mould.

In the latter case a more durable, readily cleaned, heating film layer, such as a resin impregnated glass fibre cloth or the like, is used as the layer adjacent to the concrete.

A smooth natural concrete surface is not always desired; instead one or more of many other qualities may be required, such as decoration, weather resistance or resistance to other media.

The heating film caters for these cases either by using as the layer adjacent to the concrete, a layer which will impart the desired qualities to the concrete, or a layer which incrporates these qualities and is itself transferred bodily to the concrete during or after the heating period.

Figure 22:
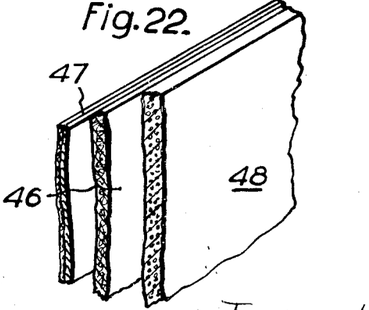
FIG. 22 illustrates the use of the film in conjunction with a layer to be transferred to the material being cured.

In the former case illustrated by FIG. 22, this layer 46 is a proper decalcomania or transfer layer as produced by the printing art in a manner itself well known. Naturally the inks or colours must be suitable for surfacing concrete, the support for the decorative materials which are transferred wet or dry, the latter for instance by heat, must be adequate as a layer of the heating film 47 and, if desired, can be a plastic abrasion resistant transparent or robust decorative film which itself is transferred together with the inks or paints.

In order to enhance the bond between the concrete and the transferred materials the back of the latter which constitutes the surface of the heating film facing the concrete can be coated with a layer 48 of cement paste or another bonding agent or a bond-promoting chemical (hardener) such as a calcium-chloride-containing mixture, prior to pouring the concdete. This paste can not only secure the decoration, but also form an improved weather resisting surfacing of the concrete of a desired colour.

Figure 23:
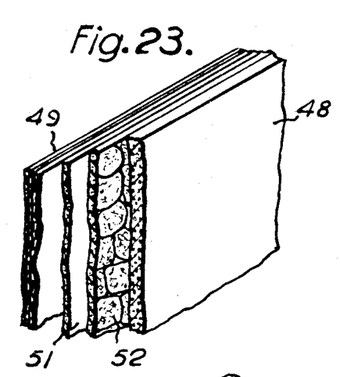
FIG. 23 illustrates a alternative type of transfer.

Two particular types of transfer for decoration of concrete will now be described. One illustrated in FIG. 23 is a temporary support on the heating film 49 by means of a glue film 51 of a kind of irregular mosaic 52 of coloured stones and lose sand, and the other illustrated by FIG. 24 a relief-bearing layer 53 of which a replica is to be formed in the concrete. The mosaic of coloured aggregate forms a traditional concrete surface after its transfer and after the sand has been brushed off; the relief forming layer is stripped-off when the concrete has hardened. It can be made of resin (e.g. epoxy resin) impregnated glass cloth or of an elastomeric material if it has undercuts which have to flex on withdrawal. The use of a coloured cement paste 54 with which the relief layer is coated prior to application to the concrete is strongly recommended. The mosaic aggregate also may be grouted with a special motar 48 while on the transfer layer.

The use of the film to carry a layer which is transferred to the concrete can also be applied to sealing of the concrete by means of a layer for example of a resin and hardener or a wax or other sealing material which may be transferred to the concrete to constitute a permanent or a temporary sealing coating, for instance to prevent evaporation of water from the concrete.

Figure 25:
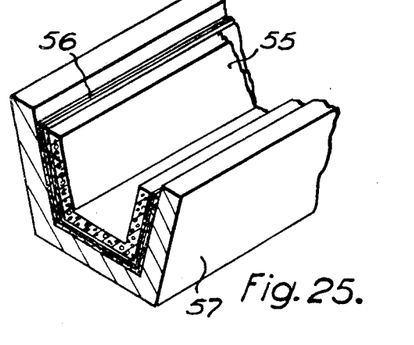
FIG. 25 illustrates the use of the invention to speed up demolding.

By taking a further step in the use of the heating film when it is placed on the inside wall of the mould, a step which can moreover be combined with the decorative or other transfer method just described, a drastic reduction of the time the mould is occupied by one pouring of concrete can be achieved. The method illustrated by FIG. 25 consists in forming only a crust 55 of concrete on the heating film 56 covering the inside of the mould 57 thin enough to cure by the aid of the heating film in a very short time, but to attain a strength to permit de-moulding. (Whether the demoulding is carried out by removing the mould from the crust or the crust from the mould depends on the shape, the facilities available, etc.) The heating film remains with the crust and continues the heat cure until the crust is sufficiently strong to act as a shell into which fresh concrete mix can be poured, the heating film then continuing the curing of both the crust and the fresh concrete.

The formation of the crust is preferably effected by a system of pneumatic spraying (Gunite or Shotcrete system) as this saves vibrating the crust and enables it together with the heating film to support itself in a minimum of time.

In almost all the examples given so far the heating film has been positioned within or on the mould structure. Certain measures will now be described which are to be recommended when the film is to be embedded within the concrete. In this case the film is almost always a dispensible one in the sense that it remains in the concrete and is not recovered.

It has been proposed to use the steel reinforcements in concrete structures for speeding up curing of the concrete by passing an electric current through them. Quite apart from many disadvantages due to the nature and shape of these reinforcements, their positioning within the structure is governed by their reinforcing function. The location of sources of heat in the structure should however be guided by the heat flow and curing requirements of the particular concrete section. These requirements are almost always quite different from those for strength.

The great advantage of placing the heating film inside a concrete structure is not only its quality and suitability as a heat source for this function, but the fact that it can be positioned where desired for best exercising this function.

The bottom of the mould is filled with water, preferably hot water, and the mould is heated by heating films which may also be placed inside the mould. The heat supplied by the films will first of all prevent the water from freezing or being frozen for some time by contact with the deep frozen dry mixture and will then accelerate the cure. The amount of water in the mould is essentially governed by the ease of vibrating the poured mass and by the filling factor of the mould volume achievable by the dry mixture. The source of the main hydrating water is the deep frozen fine ice powder of the dry mix.

The principle of a frozen dry mix is applicable not only to concrete but also to other two-part curable compounds, for instance plastics, where a powdered resin and powdered hardener can be kept intimately mixed in the desired proportion safely below the melting point of either part of the compound. This frozen dry mix is then poured into the heatable mould and quickly melted before its cure is accelerated by the heating films in or on the mould.

Among the advantages of using a deep frozen fine mix is not only the ease of ensuring accurate proportioning of the compounds of the mix and of ensuring an intimate spatial integration, but also the use of the previously described differential expansion and/or contraction of the components parts to promote additional mechanisms of contact for the chemical reaction during the heating of the mix. The fact that ice particles will not only expand prior to melting but that the volume of the melting water will for a short temperature range constitute a contraction illustrates this mechanism. Ultrasonic vibration should prove more efficient for the fine dry deep frozen mix technique than for usual concreting procedure.

The principle of progressive construction by layers, first a crust and then the volume bounded by it, which the accelerated curing by the heating film makes practically possible can also be employed not only in a direction through the thickness of the layers, but in a direction of the length or height of the layers to be poured and at least partly cured in succession. A vertical wall for instance, as illustrated by FIG. 26 may be built by first erecting shuttering for the bottom part only, casting the bottom 84 and a crust 85 inside the lower part of the shuttering, heat curing the cast material sufficiently to be able to de-shutter the lower part, re-erecting the shuttering again at a higher level as at 86, filling in the crust 85 at 87 and forming a new crust 88 at a higher level and so on. Only the fact that the acceleration of the cure by the heating film makes possible a cycle of a few hours instead of days for the completion of consecutive steps renders this a practical method.

The method can be elaborated by arranging for the shuttering to move in the same direction instead of being taken away and re-erected. A self-propagating vertical wall or tower structure is obtained, the cross-section of which in the higher parts is either the same as that of the lower parts or a modification to which the shuttering can be adapted.

Horizontal structures, such as tunnels, bridges, pipes, can also be envisaged as being constructed in a self-propagated manner. If for example a ditch is dug in the bottom of the sea and a tunnel is to be built in the ditch this tunnel can be made as a self-propagating structure.

Instead a shuttering which is lifted in steps of sufficiently cured vertical sections as in FIG. 26 an equipment is used which consists of at least two concentric tubes, but generally comprises three concentric steel tubes, not necessarily circular but of the configuration of the tunnel walls. The cross-sectional area within the outside wall of the innermost tube defines the free cross-sectional area of the tunnel.

Figures 27, 28:
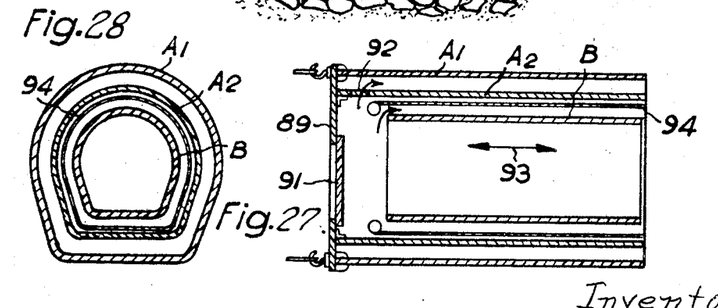

Referring now to FIGS. 27 and 28 the three tubes, $A_1$ and $A_2$ and B—B being the innermost and $A_1$ the outermost—and assuming that the movement of the tubes as well as the provision of a free path along which they are moved is effected by outside means, and further assuming that the tunnel is under water, provision must be made for the whole front cross-section of tube $A_1$ to be sealed liquid tight by a cover 89 made of steel plates which will be termed the burrowing head, although in this example the path (ditch) is assumed to have been already prepared.

If material from or for the ditch ahead of the burrowing head has to pass through the cover 89 it must be passed through pipes or hermetically sealed sluice gates such as indicated at 91.

Tubes $A_1$ and $A_2$ are immovably fixed to each other and are of about equal length, the front end of tube $A_2$ having valves and hermetically sealable doors (not shown) controlling ports such as 92 arranged in a ring adjacent to the burrowing head in order to permit pumping of grout under pressure into the narrow tubular gap between itself and tube $A_1$. The length of tubes $A_1$ and $A_2$ is greater than the length of the tunnel wall which is to be cured during the period of one cycle.

The innermost tube B is open on both ends and is not fixed to the other tubes. It can be moved axially (arrow 93) so that its front end can close up to the burrowing head, or it can be moved back to near the rear end of tube $A_2$. The radial distance between tubes $A_2$ and B defines substantially the proper wall thickness of the tunnel at any particular point of its circumference.

The movement of the tubes is a cycle of two snail-like steps. First the burrowing head with the tubes $A_1$ and $A_2$ is moved forward for the fraction of the tube length which corresponds to the length of the tunnel wall to be constructed and partly cured in the period of the cycle; this movement leaves the tube B behind like a telescopic extension. The second snail-like step is made by tube B only and brings its leading end towards the burrowing head again. The action is similar to the collapsing of a telescope.

The second step can start even before the first is completed. The concreting is carried out during the above described succession of extension and collapse effected by the tubes A and B. During (and/or after) the first step, aggregate and mortar grout, such as used for instance by the Colcrete process, is pumped into the tubular gap between tubes $A_1$ and $A_2$ through the ports 92 in tube $A_2$ which are adjacent to the burrowing head, and dispensible heating films 94 and reinforcements (not shown) are placed in the gap between tubes $A_2$ and B at the rate at which tube $A_2$ advances past the tube B. The films and the reinforcements are fed backward from the annulus at the burrowing head, the films being anchored in the concrete out from which tube $A_2$ slides. It is therefore advantageous to provide a lubricant between the film and the inner surface of tube $A_2$.

Concrete can be sprayed on to the film by a pneumatic (Gunite or Shotcrete) process before the second step starts, or in front of tube B following tubes $A_1$, $A_2$ in the second step. While this spraying is optional, the filling of the annular gap between tubes $A_2$ and B with concrete, preferably by an adaptation of an aggregate and grout pumping and vibrating method, is essential and takes place during or after the second step. Vibrating can also be effected by means which can be built into tube $A_2$ or preferably tube B.

Even prior to the completion of the second step and the filling of concrete into the whole length corresponding to the cycle described, the heating films can be switched on and the accelerated curing of both the concrete in the gap between tubes $A_2$ and B and between tubes $A_1$ can start, the procedure resulting in the mixture in the gap between tubes $A_2$ and B which will form the tunnel wall proper, attaining a minimum strength to withstand the water pressure sooner than the outside protective and anchoring grout mixture which has been—so to say—extruded rearwardly from the gap between tubes $A_1$ and $A_2$.

During the next cycle when tubes $A_1$ and $A_2$ will slide forward again, this external grout will close on to the heating film which will continue to heat not only during the first, but also during the second step of the next cycle and continue further to heat for as many subsequent cycles as desired, until the heat cure of the whole tunnel wall including the part extruded from the gap between tubes $A_1$ and $A_2$ produced during the first cycle is completed. This first cycle length of the heating film is then switched off. The heating thus progresses with the self-propagating construction in steps of a cycle length, the steel mould constituted by the tubes never extending over more than twice its own length while the heating zone in operation extends over as large a multiple of this length as may be required for the complete curing of the concrete; the period of a cycle is thus a fraction of this curing time.

It will be understood that in the method of construction described, the heating film is in sections, each section being as long as the tunnel wall produced in a single cycle. The heating film terminals are accessible at each end of each section so that the films of subsequent or various sections can be connected or disconnected in any way desired, both during the construction of the tunnel and later on if heating of the tunnel walls or of some areas of tunnel walls should be wanted.

The advantages of this self-propagating method of construction are not only a high degree of automation and saving of costs in many ways, but also a higher speed of work under better health conditions than are usual today.

As mentioned earlier in this specification, the present invention has been described mainly in its application to concrete by way of example. Professor D. F. Orchard's book "Concrete Technology," published by John Wiley, New York, N.Y., 1962, may be referred to if further details of well known processes mentioned in this specification are desired.

As has also been mentioned earlier the present invention is not limited to concrete, but can be applied with suitable variations to other materials, in particular, so-called plastics materials.

The heating film can be embedded in laminates, castings or mouldings or be placed on or in the walls of the (cold) moulds or on the laminates and accelerate the curing of such materials if the curing of the mixture or compound is based on a chemical reaction—say, between a resin and a hardener—which is accelerated by heat. It shows particular advantages if the curing can be done without high pressure. Examples of uses of plastics materials to which the invention is applicable have been given earlier herein.

It is believed that the examples above described with particular reference to concrete will also serve to make clear the application of the invention to plastics materials without further description since basically the mode of operation is the same. The difference will reside principally in the materials of the moulds, the itmes and the temperatures all of which are matters within the province of those skilled in the art.

Reference has earlier been made to a viewing box by the aid of which preliminary investigations can be made into the various factors which affect curing in any particular case. Thus, the best configuration best spacing of parallel layers of the film, progress of heating and of flow of the material, can be experimentaly studied in cross-sectional models. A container with at least one window enabling a cross-sectional view of the model layout to be taken, for instance having at least one transparent wall parallel to the cross-section of the heating film configuration to be investigated, constitutes a viewing box for visibly observing the heating effect, and such a box is a convenient experimental tool for optimizing many parameters of the arrangement, such as location of heating films within the material and on its boundaries, loading of the film or particular areas of the film in Watts per unit area, distribution and structure of the material, container shape and so forth.

The observation of the temperature rise at critical points in the viewing box can be carried out by the provision of thermocouples or other temperature sensing devices at these points, and where no visible change in the material occurs during the proposed heating cycle, the material or films can be coloured with temperature indicating chemicals (dyes or pigments).

Such a viewing box can indeed be arranged for microscopic examination so that for example the effects of pulsating the energy supply to the film or films can be closely observed and such similar close observation in the case of concrete can be facilitated by the use of coloured water for hydration; the use of coloured substances may also be possible with other materials. A viewing box is especially useful when the film is distributed within the mass of the material in close parallel layers or in tree-like and similar formations, where there is a risk of undesirable heat concentration.

What I claim is:

1. A method of producing a shaped body of curable material the solidification of which can be accelerated by heat, including the steps of positioning an electric heating film having an area not less than the area of the minimum cross section of the shaped body in a mold structure on the internal wall thereof, said mold structure defining the required shape of the body, applying only a thin crust of the curable material to the film, the crust being thick enough to form a shell of the required shape which when cured for a short time attains sufficient strength to enable the shell and mold structure to be separated, energising the film for such short time, separating the shell and mold structure while leaving the film on the shell, filling the shell with the rest of the body of material, and continuing the supply of energy to the film.

2. A method of heat treating a body of curable material the solidification of which can be accelerated by heat, including the steps of positioning in a mold structure an electric heating film having an area not less than the area of the minimum cross section of the body of material, first applying only a crust of material to the mold structure, supplying electrical energy to the film at a predetermined rate thereby to dissipate heat into the crust of material and thus increase the viscosity and solidify the crust, the crust being thin enough to cure in a very short time but to attain sufficient strength to permit separaion of the mold structure from the crust withou harm to the crust, separating the mold structure from the crust, shifting the mold structure forward, filling the shell constituted by the crust with more curable material and applying a crust of material to the mold structure, continuing the supply of energy to the film to harden the crust and the filling of material and continuing this cycle of operations.

3. A method as set forth in claim 2 in which the mold structure is constituted by at least two tubes one within the other with a space between them all round, the tube being moved forward alternately in sequence and the body of the material being supplied into the space between them, a heating film also being inserted between the tubes and left in the material so that curing by heat can be continued after both tubes have moved away from the crust formed between them.

References Cited

UNITED STATES PATENTS

| | | | |
|---|---|---|---|
| 1,215,115 | 2/1917 | Connelley et al. | 52—744 |
| 1,808,762 | 6/1931 | Brund et al. | 264—27 |
| 2,119,860 | 6/1938 | Henderson | 264—336 X |
| 2,152,365 | 3/1939 | Smith. | |
| 2,683,916 | 7/1954 | Kelly | 264—27 |
| 2,971,239 | 2/1961 | Schaich. | |
| 3,194,853 | 7/1965 | Weise ettal. | 52—744 X |
| 1,240,492 | 9/1917 | Sawyer | 52—425 |
| 1,656,423 | 1/1928 | Copeman. | |
| 2,296,018 | 9/1942 | Boyle | 264—71 X |
| 3,157,098 | 11/1964 | Mason | 50—359 X |
| 3,018,880 | 1/1962 | Brugmann | 106—97 X |
| 3,192,291 | 6/1965 | D'onofrio | 264—26 |

FOREIGN PATENTS

| | | |
|---|---|---|
| 115,347 | 10/1963 | Germany. |
| 676,627 | 7/1952 | Great Britain. |

OTHER REFERENCES

Yerzley: Vulcanization or Other Heat Treatment by Electrical Conduction, Rubber Age, November 1942, pp. 133 and 134.

ROBERT F. WHITE, Primary Examiner

J. H. SILBAUGH, Assistant Examiner

U.S. Cl. X.R.

264—34, 316, 333